(12) United States Patent
Manku

(10) Patent No.: US 9,349,029 B2
(45) Date of Patent: *May 24, 2016

(54) TRANSMISSION APPARATUS FOR A WIRELESS DEVICE

(71) Applicant: TAG-COMM INC., Waterloo (CA)

(72) Inventor: Tajinder Manku, Waterloo (CA)

(73) Assignee: TAG-COMM INC., Waterloo (CA)

( * ) Notice: Subject to any disclaimer, the term of this patent is extended or adjusted under 35 U.S.C. 154(b) by 344 days.

This patent is subject to a terminal disclaimer.

(21) Appl. No.: 13/874,996

(22) Filed: May 1, 2013

(65) Prior Publication Data

US 2014/0016719 A1 Jan. 16, 2014

Related U.S. Application Data

(60) Provisional application No. 61/670,259, filed on Jul. 11, 2012.

(51) Int. Cl.
*G06K 7/10* (2006.01)
*H04L 27/04* (2006.01)
(Continued)

(52) U.S. Cl.
CPC ........... *G06K 7/10198* (2013.01); *G01S 13/756* (2013.01); *G01S 13/758* (2013.01);
(Continued)

(58) Field of Classification Search
CPC .......... G06K 7/0008; G06K 19/07779; G06K 19/0726; G06K 19/07777; G06K 7/086; G06K 7/10237; G06K 7/10316; G06K 7/10198; H01Q 7/00; H01Q 1/2208; H01Q 1/2225; H01Q 1/243; H01Q 1/2216; H04B 5/0062; H04B 5/0068; G01S 13/758; G01S 13/756; G01S 13/825; H04L 27/008; H04L 27/04; H04L 27/2626; H04L 27/36; H04L 27/20

USPC .............. 375/315, 295; 343/700 R, 749, 750; 340/13.26, 12.51
See application file for complete search history.

(56) References Cited

U.S. PATENT DOCUMENTS 4,380,064 A * 4/1983 Ishikawa et al. ............... 370/371
4,701,871 A * 10/1987 Sasaki et al. ................... 708/272
(Continued)

FOREIGN PATENT DOCUMENTS

EP 2073036 A1 6/2009
EP 2330538 A1 6/2011
(Continued)

OTHER PUBLICATIONS

Stewart Thomas, et al., "QAM Backscatter for Passive UHF RFID Tags", RFID, 2010 IEEE International Conference on, pp. 210-214, Apr. 14-16, 2010, Orlando, Florida, USA.
(Continued)

*Primary Examiner* — Vineeta Panwalkar
(74) *Attorney, Agent, or Firm* — Gowling WLG (Canada) LLP; Joseph Conneely

(57) ABSTRACT

A transmission apparatus for a wireless device, comprising: an antenna for receiving an original signal and for backscattering a modulated signal containing information from the wireless device; a variable impedance coupled to the antenna, the variable impedance having an impedance value; and, a decoder coupled to the variable impedance for modulating the impedance value, and thereby a backscattering coefficient for the antenna, in accordance with the information to generate the modulated signal.

51 Claims, 13 Drawing Sheets

(51) Int. Cl.
  *G06K 19/07* (2006.01)
  *G01S 13/75* (2006.01)
  *H04L 27/00* (2006.01)
  *H01Q 1/22* (2006.01)
  *H01Q 1/24* (2006.01)
  *H01Q 7/00* (2006.01)
  *H04B 5/00* (2006.01)
  *G01S 13/82* (2006.01)
  *H04L 27/20* (2006.01)
  *H04L 27/26* (2006.01)
  *H04L 27/36* (2006.01)

(52) U.S. Cl.
  CPC .......... *G06K19/0723* (2013.01); *H01Q 1/2225* (2013.01); *H01Q 1/243* (2013.01); *H01Q 7/00* (2013.01); *H04B 5/0068* (2013.01); *H04L 27/0008* (2013.01); *H04L 27/04* (2013.01); *G01S 13/825* (2013.01); *H04L 27/20* (2013.01); *H04L 27/2626* (2013.01); *H04L 27/36* (2013.01)

(56) References Cited

U.S. PATENT DOCUMENTS

| | | | |
|---|---|---|---|
| 8,590,790 | B1 | 11/2013 | Manku |
| 8,847,834 | B2 | 9/2014 | Manku |
| 2002/0008656 | A1* | 1/2002 | Landt ............... 342/42 |
| 2004/0069852 | A1* | 4/2004 | Seppinen et al. ............ 235/451 |
| 2005/0083179 | A1* | 4/2005 | Carrender et al. ........... 340/10.4 |
| 2005/0117663 | A1 | 6/2005 | Drogi et al. |
| 2006/0145817 | A1* | 7/2006 | Aikawa et al. ............... 340/10.3 |
| 2007/0290747 | A1* | 12/2007 | Traylor et al. ................. 330/133 |
| 2008/0081571 | A1* | 4/2008 | Rofougaran ............... 455/127.1 |
| 2008/0225932 | A1 | 9/2008 | Fukuda |
| 2011/0089955 | A1* | 4/2011 | Kato et al. .................... 324/629 |
| 2011/0169523 | A1* | 7/2011 | Atrash et al. .................... 326/30 |
| 2015/0009018 | A1 | 1/2015 | Manku |

FOREIGN PATENT DOCUMENTS

| | | |
|---|---|---|
| WO | 2013170338 A1 | 11/2013 |
| WO | 2013177658 A1 | 12/2013 |

OTHER PUBLICATIONS

Harry Stockman, "Communication by Means of Reflected Power", Proceedings of the I.R.E., pp. 1196-1204, vol. 36, 1948, Oct. 1948.

International Searching Authority (ISA/CA), International Search Report and Written Opinion, mailed Aug. 2, 2013, for corresponding International Patent Application No. PCT/CA2013/000456.

Chawla, V., et al., "An Overview of Passive RFID", IEEE Communications Magazine, vol. 45, Issue 9, Sep. 2007, pp. 11 to 17.

Japanese Patent Office, Office Action (with Translation), mailed Aug. 13, 2015, for corresponding Japanese Patent Application No. 2015-520781.

Stewart J. Thomas, et al., "Quadrature Amplitude Modulated Backscatter in Passive and Semipassive UHF RFID Systems", IEEE Transactions on Microwave Theory and Techniques, vol. 60, No. 4, Apr. 2012, pp. 1175-1182.

Korean Office Action dated Oct. 29, 2015, issued by the Korean Intellectual Property Office for corresponding Korean Patent Application No. 10-2015-7000340.

English translation of Korean Office Action dated Oct. 29, 2015, issued by the Korean Intellectual Property Office for corresponding Korean Patent Application No. 10-2015-7000340.

Japanese Patent Office, Office Action (with translation) mailed Dec. 8, 2015, for corresponding Japanese Patent Application No. 2015-520781.

Hori, Shinichi et al., "A 0.7-3GHz Envelope $\Delta\Sigma$ Modulator Using Phase Modulated Carrier Clock for Multi-mode/band Switching Amplifiers", IEEE, 2011.

Extended European Search Report Dated February 1, 2016 Which Issued From the European Patent Office for Corresponding European Patent Application No. 13816055.1.

Thomas, Steward J. et al., "Quadrature Amplitude Modulated Backscatter in Passive and Semipassive UHF RFID Systems", IEEE Transactions on Microwave Theory and Techniques, vol. 60, No. 4, April 2012, 8 pages.

* cited by examiner

PSK Reflected power ions for their operation.
TRANSMISSION APPARATUS FOR A WIRELESS DEVICE This application claims priority from U.S. Provisional Patent Application No. 61/670,259, filed Jul. 11, 2012, and incorporated herein by reference.

FIELD OF THE INVENTION

This invention relates to the field of radio frequency identification systems, and more specifically, to transmission apparatus for wireless devices (e.g., tags) in backscattered and inductively coupled radio frequency identification systems.

BACKGROUND OF THE INVENTION

Radio frequency identification ("RFID") systems have become very popular in a great number of applications. A typical RFID system 100 is shown in FIG. 1. The RFID system 100 includes an application system 110, a reader 120, and a tag 130. When the tag 130 appears in the operational range of the reader 120, it starts receiving both energy 140 and data 150 via its antenna 133 from the reader 120 via its transmitter/receiver 121 and antenna 123. A rectify circuit 131 in the tag 130 collects and stores the energy 140 for powering the other circuits (e.g., control/modulator 132) in the tag 130. After collecting enough energy 140, the tag 130 may operate and send back pre-stored data to the reader 120. The reader 120 then passes the received response data via a communications interface 160 to the server system/database 111 of the application system 110 for system applications.

The tags 130 in RFID system 100 may be classified into passive and active types according to the power provisions of the tags. Passive tags do not have their own power supply and therefore draw all power required from the reader 120 by electromagnetic energy received via the tag's antenna 133. In contrast, active tags incorporate a battery which supplies all or part of the power required for their operation.

A typical transmission method of energy 140 and data 150 between a reader 120 and a tag 130 in a RFID system 100 is by way of backscatter coupling (or backscattering). The antenna 123 of the reader 120 couples energy 140 to the tag 130. By modulating the reflection coefficient of the tag's antenna 133, data 150 may be transmitted between the tag 130 and the reader 120. Backscattering, as shown in FIG. 2, is typically used in microwave band RFID systems. Power $P_{in}$ is emitted from the reader's antenna 123. A small proportion of $P_{in}$ is received by the tag's antenna 133 and is rectified to charge the storing capacitor in the tag 130 for serving as a power supply. After gathering enough energy, the tag 130 begins operating. A portion of the incoming power $P_{in}$ is reflected by the tag's antenna 133 and returned as power $P_{return}$. The reflection characteristics may be influenced by altering the load connected to the antenna 133. In order to transmit data 150 from the tag 130 to the reader 120, a transistor is switched on and off in time with the transmitted data stream. The magnitude of the reflected power $P_{return}$ may thus be modulated and picked up by the reader's antenna 123.

Amplitude shift keying ("ASK") modulation is typically used in RFID systems 100. In ASK modulation, the amplitude of the carrier is switched between two states controlled by the binary transmitting code sequence. Also, in some applications, phase shift keying ("PSK") modulation is also used. However, arbitrary complex type modulations are generally not used in current RFID backscattering systems. Here complex type modulations are ones that are normally expressed as I+jQ, where I is the in-phase component, Q is the quadrature component, and j is the square root of −1.

For reference, the beginnings of RFID use may be found as far back as World War II. See for example, Stockman H., "Communication By Means of Reflected Power," Proc. IRE, pp. 1196-1204, October 1948. Passive and semi-passive RFID tags were used to communicate with the reader by radio frequency ("RF") backscattering. In backscattering RFID systems, a number of tags 130 interact with a main reader device 120 as shown in FIG. 3. The reader 130 is used to: (i) power up the tags 130 via the power of the RF signal; (ii) transfer data to the tags 130; and, (iii) read information from the tags 130.

Typically, a link budget exists between the reader 120 and the tag 130. The tag 130 communicates with the reader 120 by backscattering the RF signal back to the reader 120 using either ASK or PSK modulation. One advantage of the backscattering method is that it does not need to generate an RF carrier on chip within the tag 130, thus it requires less power, less complexity, and less cost. A typical block diagram of a backscattering transmission apparatus 400 for a tag 130 is shown in FIG. 4. In FIG. 4, $Z_{ant}$ is the impedance of the antenna 133 and $Z_o$ is a fixed impedance which is in parallel with a switch 410. The reflection coefficient $\Gamma$ is given by the equation:

$$\Gamma = \frac{Z_o - Z_{ant}}{Z_o + Z_{ant}}$$

With the switch 410 on (i.e., closed), $\Gamma=1$. When the switch is off (i.e., open), $\Gamma=0$. By turning the switch 410 on and off, an ASK signal 420 is generated as shown in FIG. 4.

PSK signals may also be generated using a similar set up. This is shown in the transmission apparatus 500 illustrated in FIG. 5. Here, the reflection coefficient $\Gamma$ is given by the equation:

$$\Gamma = \frac{(Z_i + Z_o) - Z_{ant}}{(Z_i + Z_o) + Z_{ant}}$$

Here, $Z_i$ is an impedance that is switched in as per FIG. 5. So, depending on the position of the switch 410, 510, backscattering is designed to produce either an ASK signal 420 or a PSK signal 520.

As shown in FIG. 6, using backscattering techniques, each tag 130 sends RF signals 610 on the same carrier 620 and hence overlapping the RF spectrum of other tags 130. This poses a challenge which respect to avoiding data collisions between all of the tags 130. In current systems, these collision issues are solved via the communication protocol used between the reader 120 and the tags 130.

In Thomas S., Reynolds S. Matthew, "QAM Backscatter for Passive UHF RFID Tags", IEEE RFID, p. 210, 2010 (Thomas et al.), the generation of four quadrature amplitude modulation ("QAM") signals was proposed in which a number of r values are switched in and out.

There are several problems with prior tag transmission apparatus. For example, systems such as that proposed by Thomas et al. are limited in the nature of signals that they can backscatter. That is, any arbitrary signal cannot be transmitted. For example, if the QAM signal is first filtered via a filter, Thomas et al.'s system cannot transmit a filtered version of the QAM signal. As another example, if the signal is simply a sine wave or a Gaussian minimum shift keying ("GMSK")

signal, Thomas et al.'s system cannot be used to transmit this signal. As a further example, Thomas et. al.'s system cannot transmit single side band signals.

A need therefore exists for an improved transmission apparatus for wireless devices (e.g., tags) in backscattered and inductively coupled radio frequency identification systems. Accordingly, a solution that addresses, at least in part, the above and other shortcomings is desired.

SUMMARY OF THE INVENTION

According to one aspect of the invention, there is provided a transmission apparatus for a wireless device, comprising: an antenna for receiving an original signal and for backscattering a modulated signal containing information from the wireless device; a variable impedance coupled to the antenna, the variable impedance having an impedance value; and, a decoder coupled to the variable impedance for modulating the impedance value, and thereby a backscattering coefficient for the antenna, in accordance with the information to generate the modulated signal.

BRIEF DESCRIPTION OF THE DRAWINGS

Features and advantages of the embodiments of the present invention will become apparent from the following detailed description, taken in combination with the appended drawings, in which:

FIG. 12($b$) is a block diagram illustrating an equivalent circuit for the REID system of FIG. 12($a$) in accordance with an embodiment of the invention; and, FIG. 13 is a block diagram illustrating a transmission apparatus using inductive coupling for a wireless device for transmitting signals to a reader based on a digital waveform input in accordance with an embodiment of the invention.

It will be noted that throughout the appended drawings, like features are identified by like reference numerals.

DETAILED DESCRIPTION OF THE EMBODIMENTS

In the following description, details are set forth to provide an understanding of the invention. In some instances, certain software, circuits, structures and methods have not been described or shown in detail in order not to obscure the invention. The term "apparatus" is used herein to refer to any machine for processing data, including the systems, devices, and network arrangements described herein. The term "wireless device" is used herein to refer to RFID tags, RFID transponders, cellular telephones, smart phones, portable computers, notebook computers, or similar devices. The present invention may be implemented in any computer programming language provided that the operating system of the data processing system provides the facilities that may support the requirements of the present invention. Any limitations presented would be a result of a particular type of operating system or computer programming language and would not be a limitation of the present invention. The present invention may also be implemented in hardware or in a combination of hardware and software.

Figure 1:
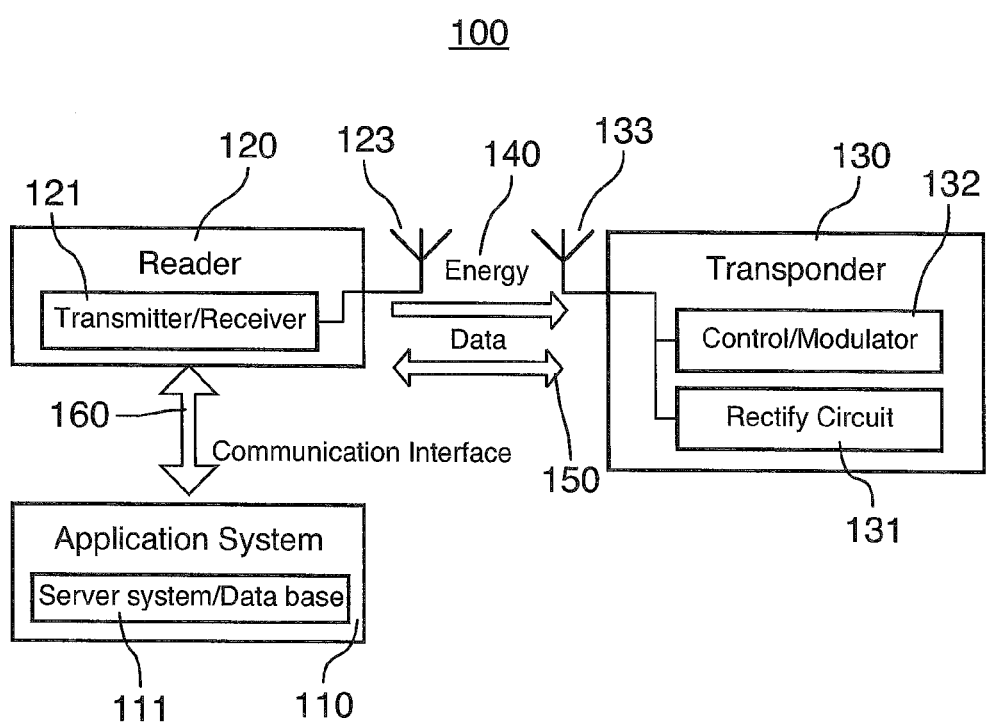
FIG. 1 is a block diagram illustrating a radio frequency identification (RFID) system in accordance with the prior art.
Figure 2:
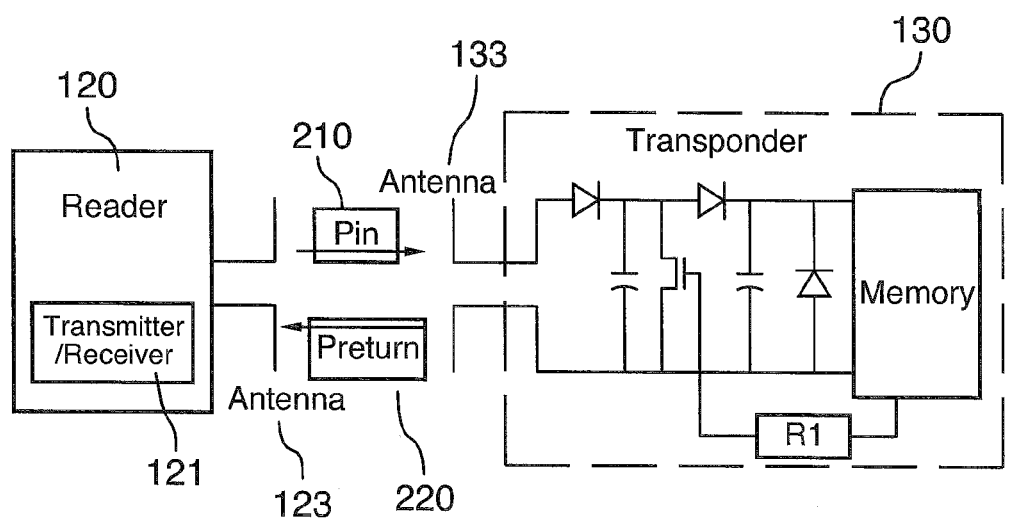
FIG. 2 is a block diagram illustrating transmission of energy and data between a reader and a tag in a RFID system in accordance with the prior art.
Figure 3:
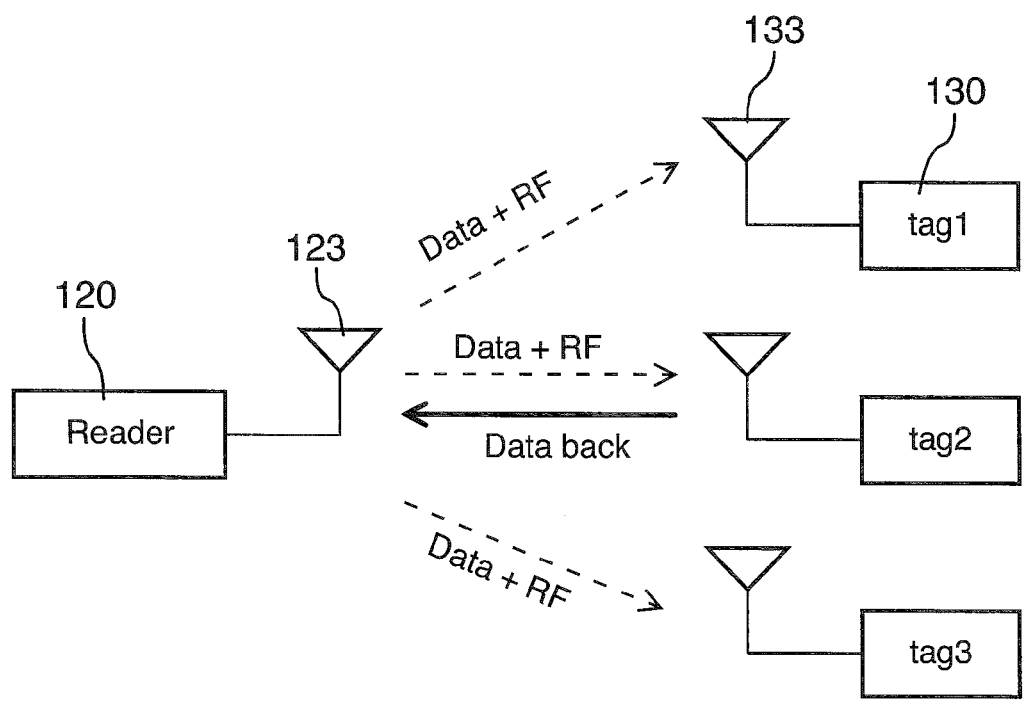
FIG. 3 is a block diagram illustrating communications between a reader and multiple tags in an RFID system in accordance with the prior art.
Figure 4:
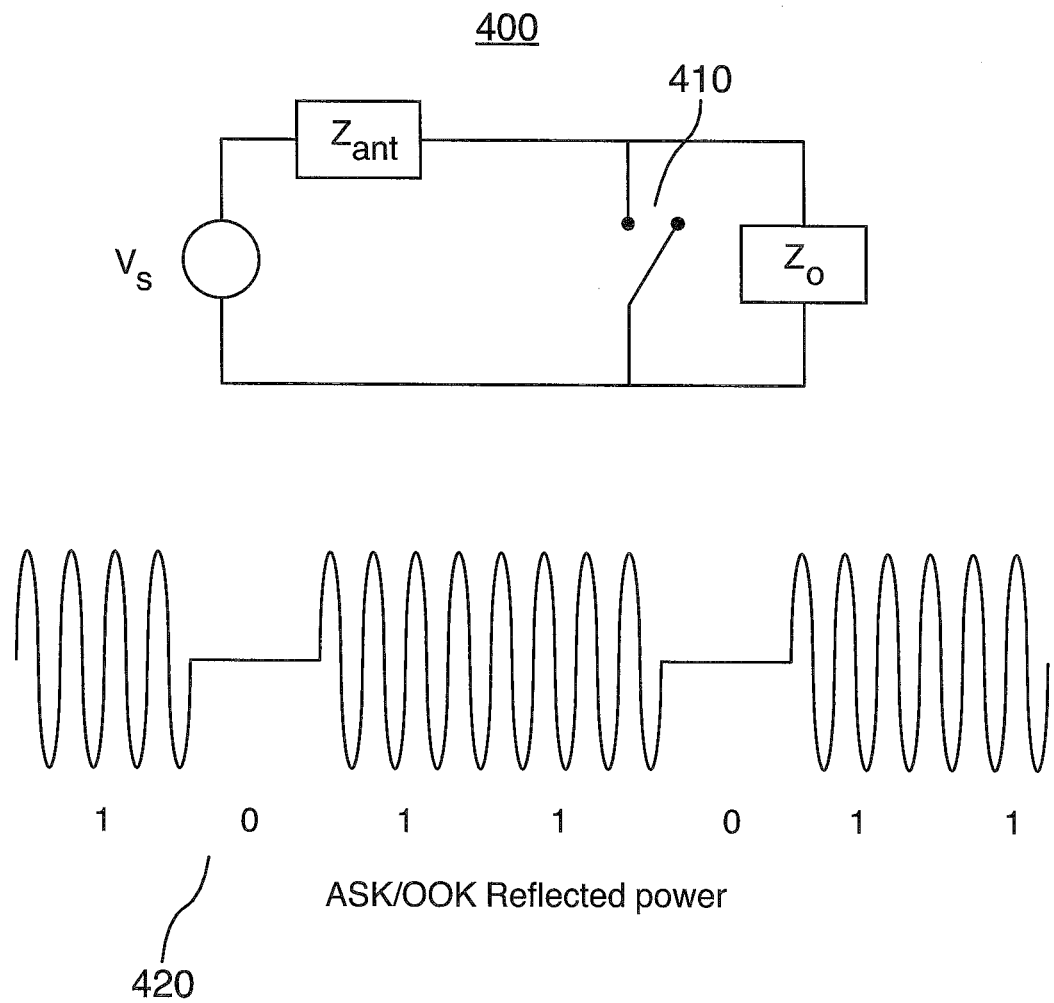
FIG. 4 is a block diagram illustrating a transmission apparatus for a tag for backscattering ASK and/or on-off keying ("OOK") signals in accordance with the prior art.
Figure 5:
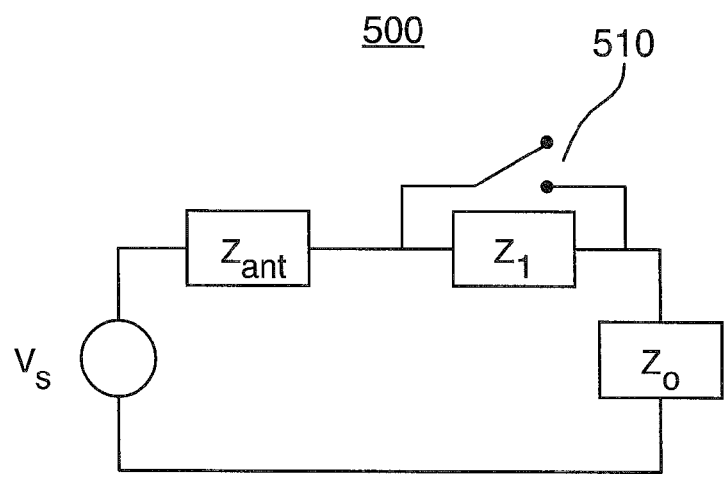
FIG. 5 is a block diagram illustrating a transmission apparatus for a tag for backscattering PSK signals in accordance with the prior art.
Figure 5:
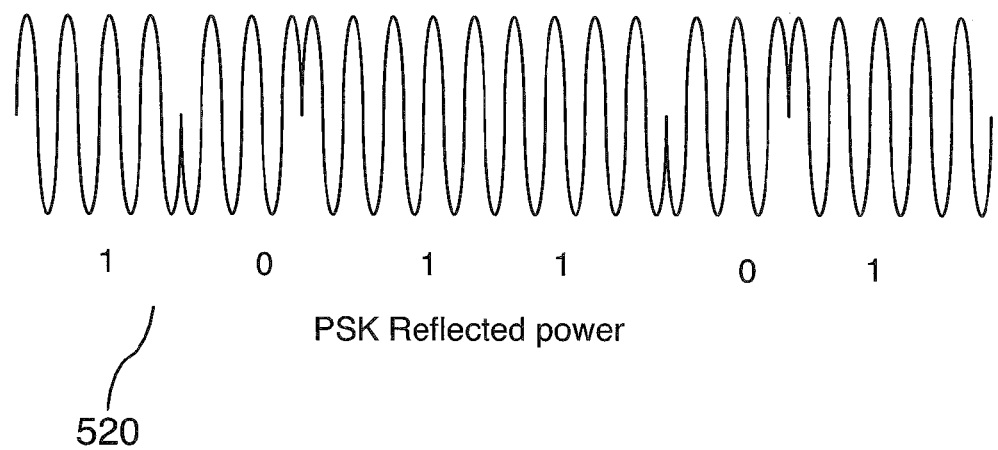
Figure 6:
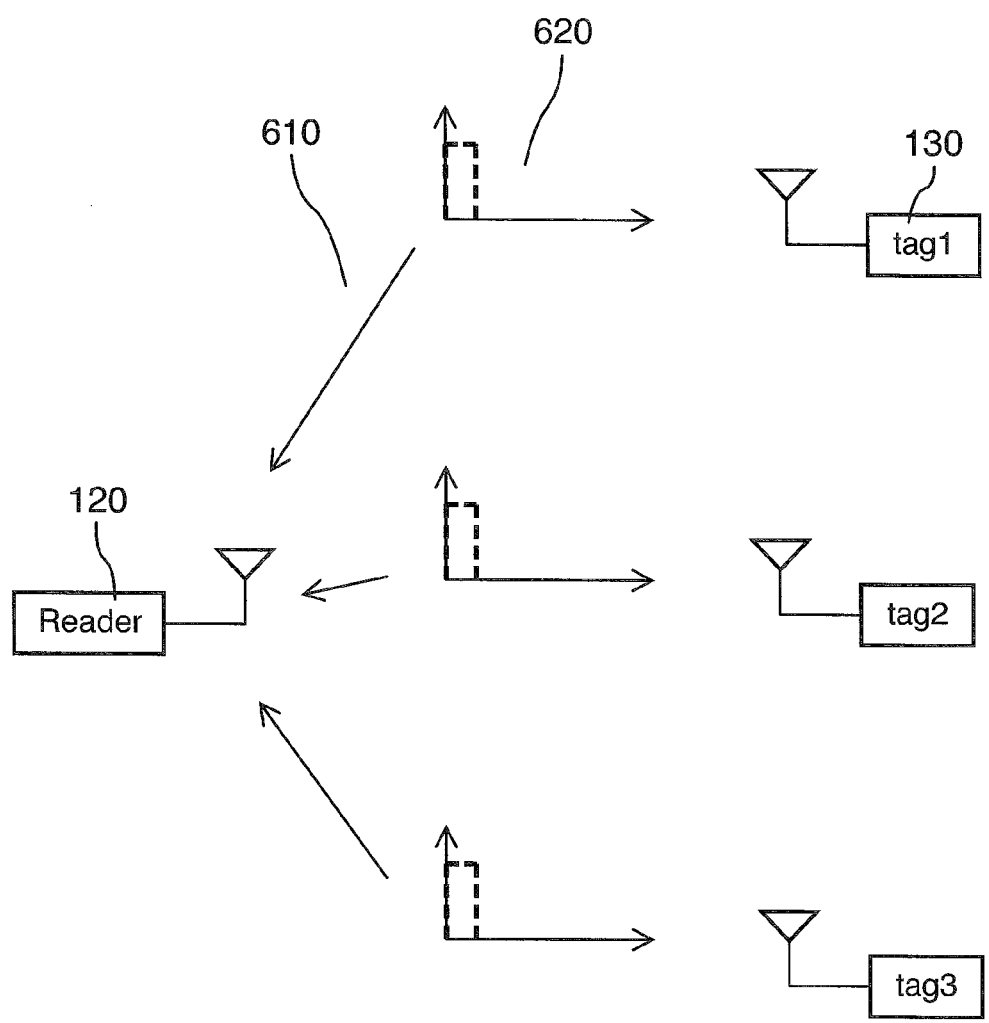
FIG. 6 is a block diagram illustrating multiple tags communicating back to a reader using the same frequency spectrum in accordance with the prior art.
Figure 7:
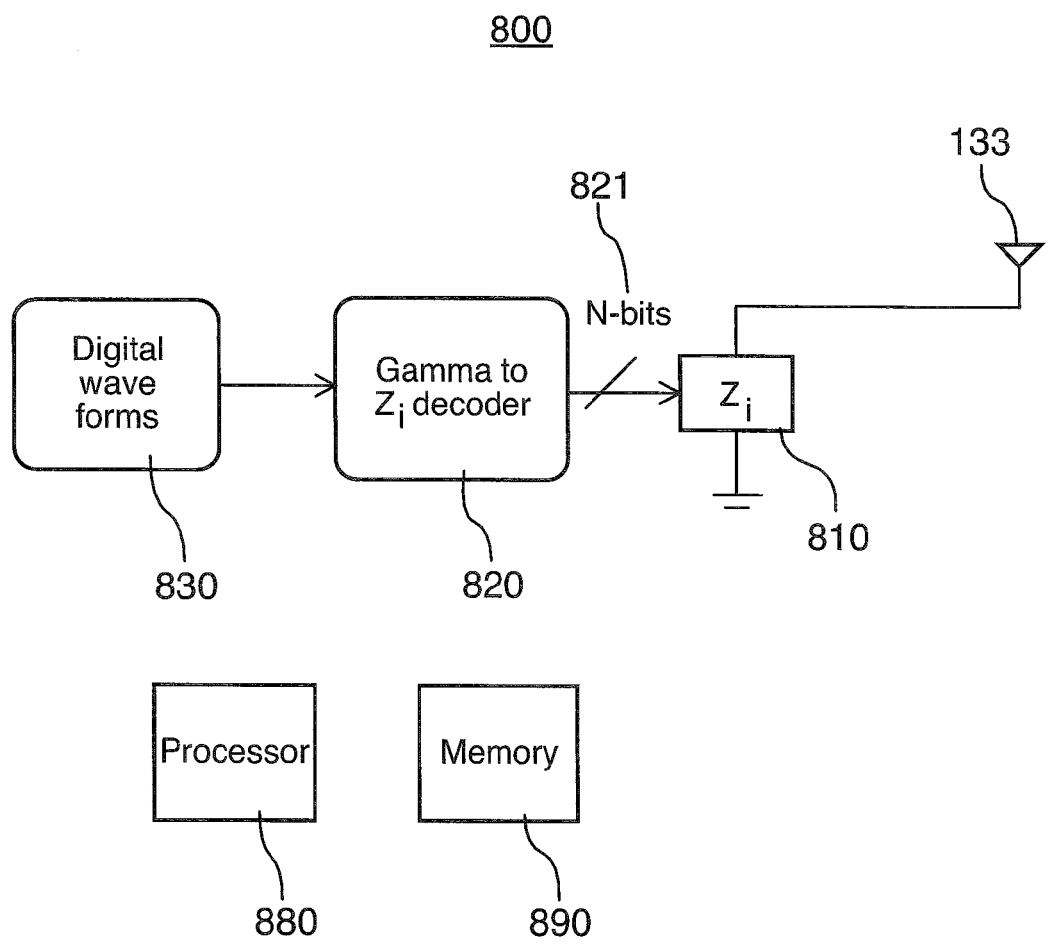
FIG. 7 is a block diagram illustrating a transmission apparatus for a wireless device for backscattering signals to a reader based on a digital wave form input in accordance with an embodiment of the invention.

FIG. 7 is a block diagram illustrating a transmission apparatus 800 for a wireless device 130 for backscattering signals to a reader 120 based on a digital wave form input 830 in accordance with an embodiment of the invention. The present invention provides a method and apparatus for generating complex waveforms for passive and semi-passive RFID systems 100. The complex wave forms may generate any type of complex modulation signals such as 8-constellation phase shift keying ("8PSK), orthogonal frequency-division multiplexing ("OFDM"), or n-constellation quadrature amplitude modulation ("nQAM"). The method and apparatus may also be used to generate frequency channels for each wireless device 130. In general, the transmission apparatus (e.g., 800) consists of an array of impedances 810 that are switched on or off via a backscattering decoder 820 in the wireless device 130. The signal 830 applied to the input of the decoder 820 may consist of any type of digital signal. The transmission apparatus 800 may include a processor 880 for controlling the decoder 820, memory 890 for storing information (e.g., digital waveforms 830), and related hardware and software as is known to one of skill in the art.

Figure 8:
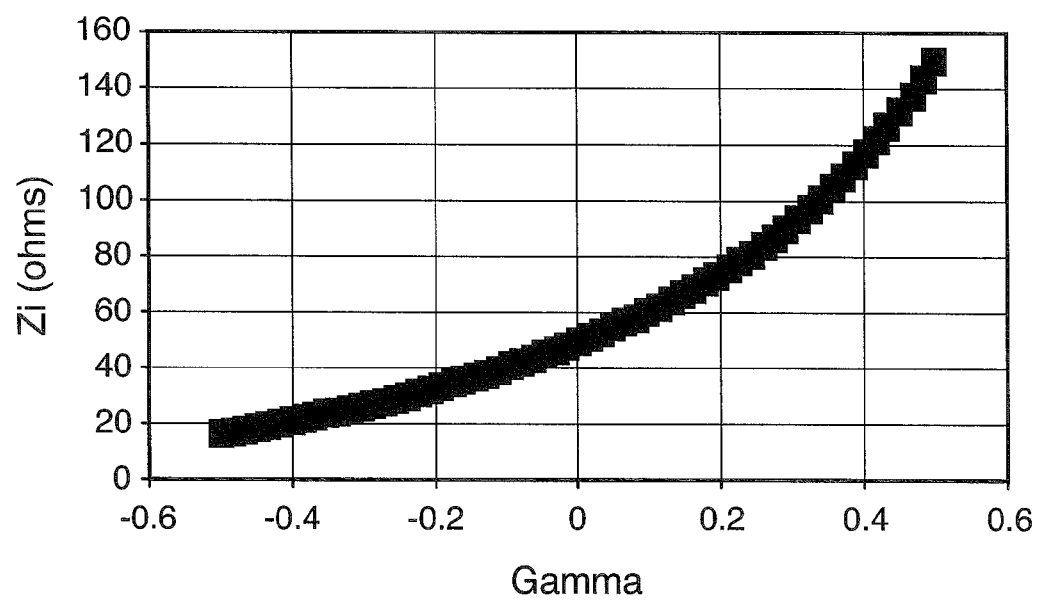
FIG. 8 is a graph illustrating the relationship between Gamma ($\Gamma$) and $Z_i$ in accordance with an embodiment of the invention.

FIG. 8 is a graph illustrating the relationship between Gamma ($\Gamma$) and $Z_i$ in accordance with an embodiment of the invention. Here, $\Gamma$ is the reflection coefficient and $Z_i$ is the impedance seen by the antenna. The reflection coefficient is directly proportional to the digital wave form 830. According to one embodiment of the invention, for backscattering RF applications, the reflection or backscattering coefficient Gamma ($\Gamma$) is given by:

$$\Gamma_i = \alpha e^{j\phi_i}$$

where $\phi_i$ is the phase, $\alpha$ is the magnitude of the reflection coefficient, and j is the square root of −1. The back scattering impedance (i.e., the impedance seen by the antenna 133) is then given by:

$$Z_i = \frac{Z_s(1 + \alpha e^{j\phi_i})}{(1 - \alpha e^{j\phi_i})}$$

where $Z_s$ is a constant (typically 50 ohms) and $Z_i$ is the back scattering impedance value.

Assuming the phase is zero:

$$Z_i = \frac{Z_s(1 + \alpha)}{(1 - \alpha)}$$

If s(t) is a signal (e.g., a sine wave) that is to be sent to the reader 120, it must be directly related to α(t) (e.g., s(t) is directly proportional to α(t)) and thus Γ. This produces an impedance value $Z_i$ that varies with time.

In this embodiment, the signal s(t) would be backscattered back to the reader 120 by the wireless device 130. The transmission apparatus 800 is shown in FIG. 7 where N-bits 821 are applied to the variable impedance 810 such that the impedance value $Z_i$ is encoded as shown in FIG. 8. Here, the variable impedance 810 has N states. If there are any errors in the encoding or imperfections in encoding of $Z_i$, these may be corrected within the reader 120. This is possible if for some time the signal s(t) is known by the reader 120. The reader 120 than may add distortion to the incoming signal to correct for these imperfections.

The variable impedance 810 may be made up of an array of impedances that are switched in and out depending on the digital decoder 820. Also, the variable impedance 810 may be controlled via an analog signal, that is, after the Gamma to $Z_i$ decoder 820, a digital to analog converter ("DAC") (not shown) may be added to drive the variable impedance 810.

Figure 9:
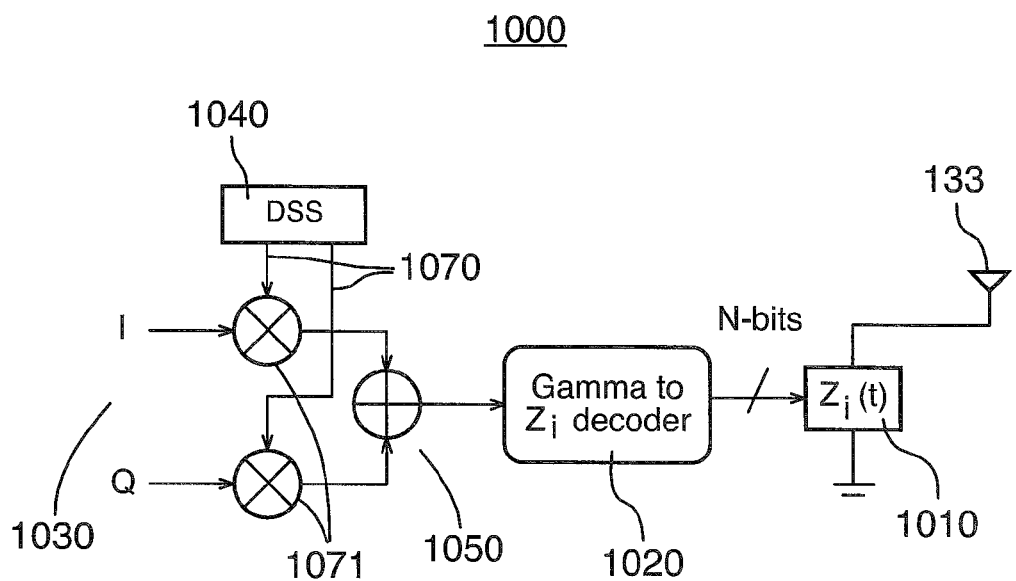
FIG. 9 is a block diagram illustrating a transmission apparatus with an adder for a wireless device for backscattering arbitrary modulated signals to a reader based on I and Q data input in accordance with an embodiment of the invention.

FIG. 9 is a block diagram illustrating a transmission apparatus 1000 with an adder 1050 for a wireless device 130 for backscattering arbitrary modulated signals to a reader 120 based on I and Q data input 1030 in accordance with an embodiment of the invention. According to one embodiment, the digital waveform 830 may be in-phase ("I") and quadrature ("Q") data 1030 as shown in FIG. 9. In FIG. 9, a digital signal generator ("DSS") 1040 may optionally up-convert (or offset) the I and Q data 1030. For example, the DSS 1040 may provide sine (or cosine) and cosine (or sine) signals 1070 that are applied to I and Q data by respective mixers 1071. Alternatively, the DSS 1040 may generate a constant value that is multiplied onto the I and Q data (i.e., the mixers 1071 act as gain elements). The Gamma to $Z_i$ decoder 1020 receives the up-converted (or offset) I and Q data and applies it to the variable impedance 1010. The variable impedance 1010 may be made up of an array of impedances that are switched in or out (e.g., a parallel array of impedances with respective switches).

Figure 10:
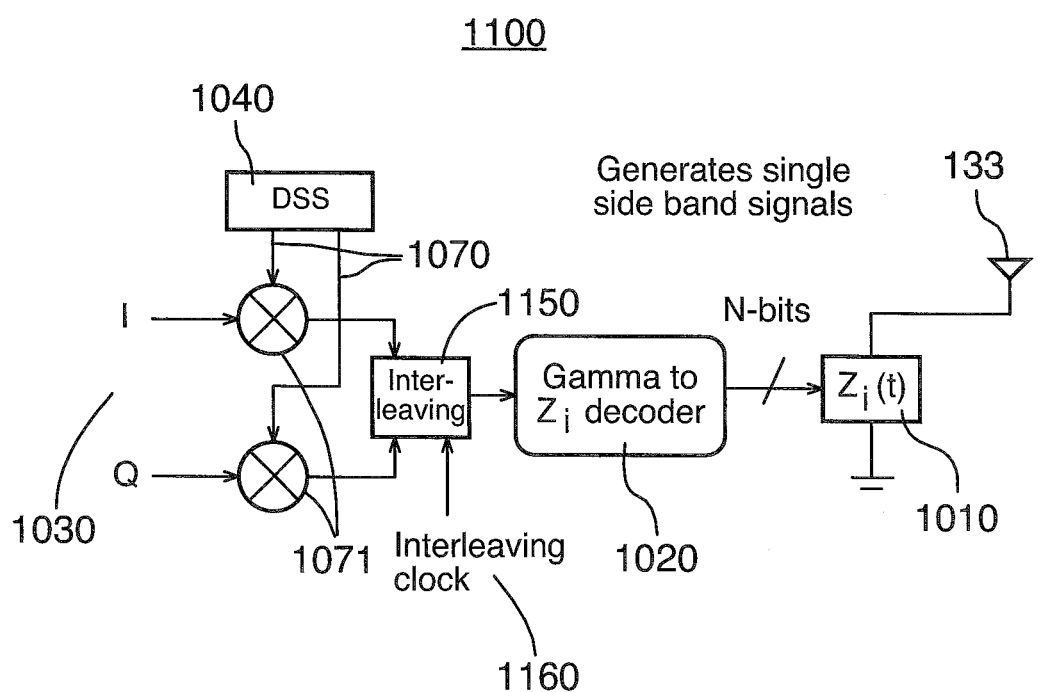
FIG. 10 is a block diagram illustrating a transmission apparatus with an interleaver for a wireless device for backscattering arbitrary modulated signals to a reader based on I and Q data input in accordance with an embodiment of the invention.

FIG. 10 is a block diagram illustrating a transmission apparatus 1100 with an interleaver 1150 for a wireless device 130 for backscattering arbitrary modulated signals to a reader 120 based on I and Q data input 1030 in accordance with an embodiment of the invention. In FIG. 10, a digital signal generator ("DSS") 1040 may optionally up-convert (or offset) the I and Q data 1030. For example, the DSS 1040 may provide sine (or cosine) and cosine (or sine) signals 1070 that are applied to I and Q data by respective mixers 1071. Alternatively, the DSS 1040 may generate a constant value that is multiplied onto the I and Q data (i.e., the mixers 1071 act as gain elements). The transmission apparatus 1000 of FIG. 9 generates double side band ("DSB") signals. To generate single side band ("SSB") signals, the adder 1050 may be replaced by an interleaver 1150 that allows I or Q signals to successively pass through to the Gamma to $Z_i$ decoder 1020. Here I data is passed through during one clock cycle and Q data is passed through during the next clock cycle. Referring to FIGS. 7, 9, and 10, according to one embodiment, the DSS 1040, mixers 1071, adder 1050, and interleaver 1150 may be bypassed and the complex (or real) digital bit stream may be fed directly into the Gamma to $Z_i$ decoder 1020 as shown in FIG. 7.

During the I cycle, the impedance value is set to:

$$Z_i = \frac{Z_s(1 + \alpha_I)}{(1 - \alpha_I)}$$

where $\alpha_I$ represents the I data. The translation between $\alpha_I$ and $Z_i$ is performed by the Gamma to $Z_i$ decoder 1020.

During the Q cycle, the impedance value is set to:

$$Z_i = \frac{Z_s(1 + j\alpha_Q)}{(1 - j\alpha_Q)}$$

where $\alpha_Q$ represents the Q data. The translation between $\alpha_Q$ and $Z_i$ is performed by the Gamma to $Z_i$ decoder 1020. Note that the difference between the Gamma to $Z_i$ decoder 1020 with respect to the I cycle and the Q cycle is a 90 degree phase shift.

If there are any errors in the encoding or imperfections in $Z_i$, these may be corrected within the reader 120. This is possible if for some time the I and/or Q signal is known by the reader 120. The reader 120 may then add distortion to the incoming signal to correct for all these imperfections. For example, if there is an error in producing a 90 degree phase shift between the I and Q signals, this may be corrected for if for sometime t, the I and Q signals are known. For example, if the I and Q signals are known to be I=sin(ωt) and Q=cos(ωt), where ω is an offset frequency, due to errors in generating the correct 90 degree shift between the I and Q signals, the reader may receive an I=sin(ωt+Θ) signal and a Q=cos(ωt−Θ) signal, where Θ is the error. In such a case, the reader may correct this error using methods known to one skilled in the art.

The $Z_i$ for I and the $Z_i$ for Q may be implemented by a variable impedance 1010 having an array of impedances that are switched in and out depending on the digital decoder 1020. Also, the variable impedance 1010 may be controlled via an analog signal, that is, after the Gamma to $Z_i$ decoder 1020, a DAC may be added to set the $Z_i$ values of the variable impedance 1010.

If the signal to be backscattered has only phase changes, α is constant (denoted $\alpha_o$) and only $\phi_i$ changes:

$$Z_i = \frac{Z_s(1 + \alpha_o e^{j\phi_i})}{(1 - \alpha_o e^{j\phi_i})}$$

Here, the value of $\phi_i$ is applied to the decoder 1020 and then generates an impedance value $Z_i$.

If there are any errors in the encoding or imperfections in $Z_i$, these may be corrected for within the reader 120. This is possible if for some time the signal $\phi_i$ is known by the reader 120 for a given time. The reader 120 may then add distortion to the incoming signal to correct for these imperfections.

The variable impedance 1010 may be made up of an array of impedances that are switched in and out depending on the digital decoder 1020. Also, the variable impedance 1010 may be controlled via a analog signal, that is, after the Gamma to $Z_i$ decoder 1020, a DAC may be added to set the impedance values $Z_i$ of the variable impedance 1010.

Figure 11:
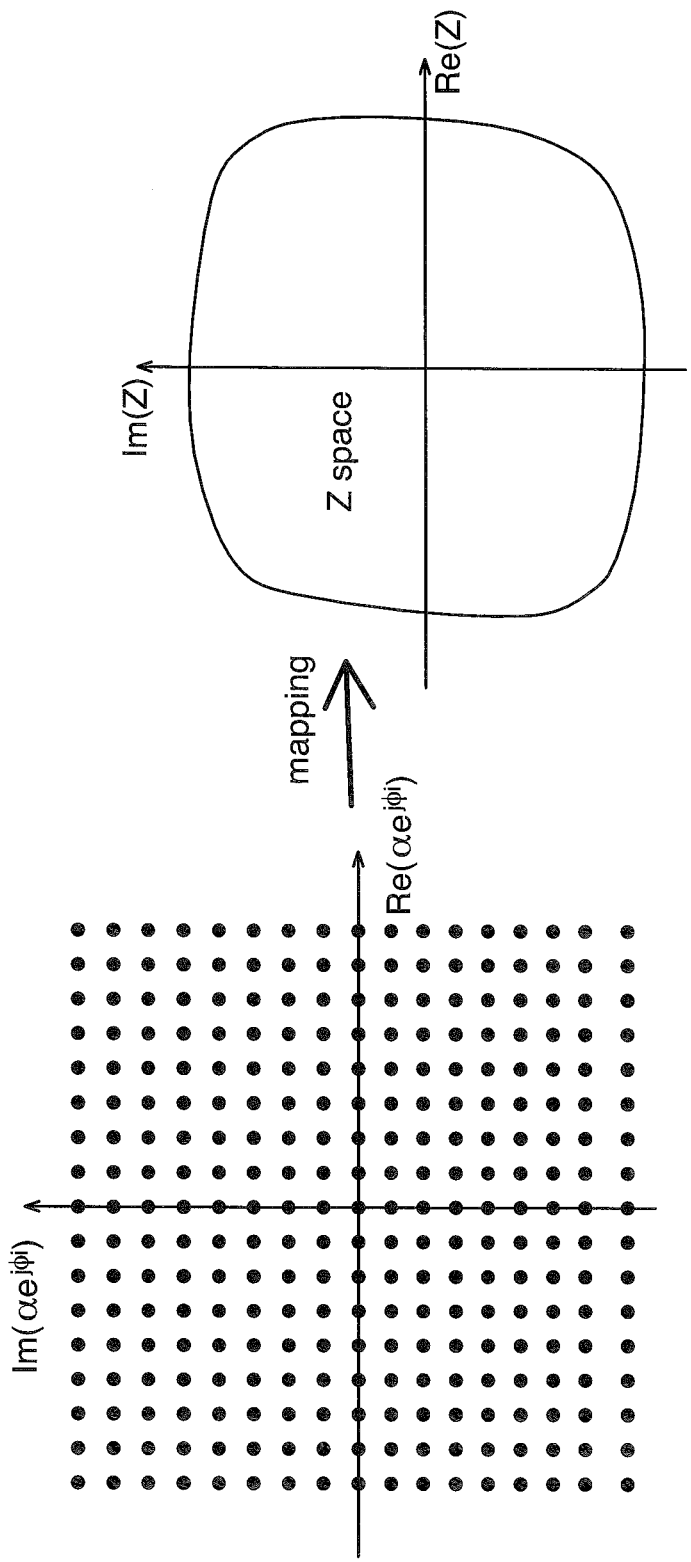
FIG. 11 are graphs illustrating the mapping of $\Gamma$ values to Z-space in accordance with an embodiment of the invention.

FIG. 11 are graphs illustrating the mapping of Γ values to Z-space in accordance with an embodiment of the invention. In general, any value of Γ may be applied to Z-space via the equation:

$$Z_{Space} = \frac{Z_s(1 + \alpha e^{j\phi_i})}{(1 - \alpha e^{j\phi_i})}$$

This is shown in FIG. 11. This represents the most general case where both α and $\phi_i$ are changing.

If there are any errors in the encoding or imperfections in $Z_{space}$, these may be corrected within the reader 120. This is possible if for some time the signal Γ is known by the reader 120. The reader 120 than may then add distortion to the incoming signal to correct for all these imperfections.

$Z_{space}$ may be implemented by a variable impedance made up of an array of impedances that are switched in and out depending on the digital decoder. Also, the variable impedance may be controlled via a analog signal, that is, after the Gamma to $Z_{space}$ decoder, a DAC may be added to set the impedance value $Z_{space}$ of the variable impedance.

Summarizing the above, and referring again to FIG. 7, according to one embodiment an antenna 133 is used to backscatter an incoming radio frequency signal coming from a reader 120. The antenna 133 is electrically coupled to an array of impedance devices connected to switches. The array of impedance devices (e.g., 810) may be digitally controlled by a digital block (e.g., decoder 820) that is driven by an arbitrary N-bit digital waveform (e.g., 830). The digital block 820 presents an output to the array of impedances 810 that is related to the N-bit digital waveform 830. A change in the impedance value of the array of impedances 810 backscatters the incoming radio frequency signal thus producing a direct up-converted version of the output of the digital waveform 830 with respect to the incoming radio frequency. The output of the digital block 820 switches the array of impedances 810 between various states, which changes the characteristics of the reflection coefficient Γ. The signal 830 applied to the digital block 820 may take the form of any complex modulation signal, for example, GMSK, nPSK, 8PSK, nQAM, OFDM, etc., and such signals may be offset from the incoming radio frequency signal by a frequency+/−ω.

Referring again to FIGS. 9 and 10, the input 1030 to the digital block 1020 may alternate between in-phase (i.e., I) and quadrature (i.e., Q) signals via a control signal (e.g., 1160). Also, the array of impedances 1010 may switch between backscattering coefficients that are 90 degrees offset from each other depending on whether the data is I or Q data. For example, if the I signals would produce backscattering coefficients at theta degrees then the Q signals would produce backscattering coefficients that are theta+90 degrees. The control signal may be a clock signal 1160. The signals 1070 applied to the I and Q signals 1030 by the DSS 1040 may take the form of a direct current ("DC") signal (i.e., no frequency offset) or of sine and cosine waves at a selected frequency (i.e., to give a frequency offset of ω). The I and Q signals applied to the digital block 1020 may be adjusted to compensate for any errors in the impedance array 1010 or the digital block 1020. The array of impedances 1010 may include some filtering characteristics to filter off some of the digital block's out of band noise. And, the reader 120 used to detect the backscattered signal from the wireless device 130 may compensate for any errors generated within the impedance array 1010 or the digital block 1020.

Figure 12A:
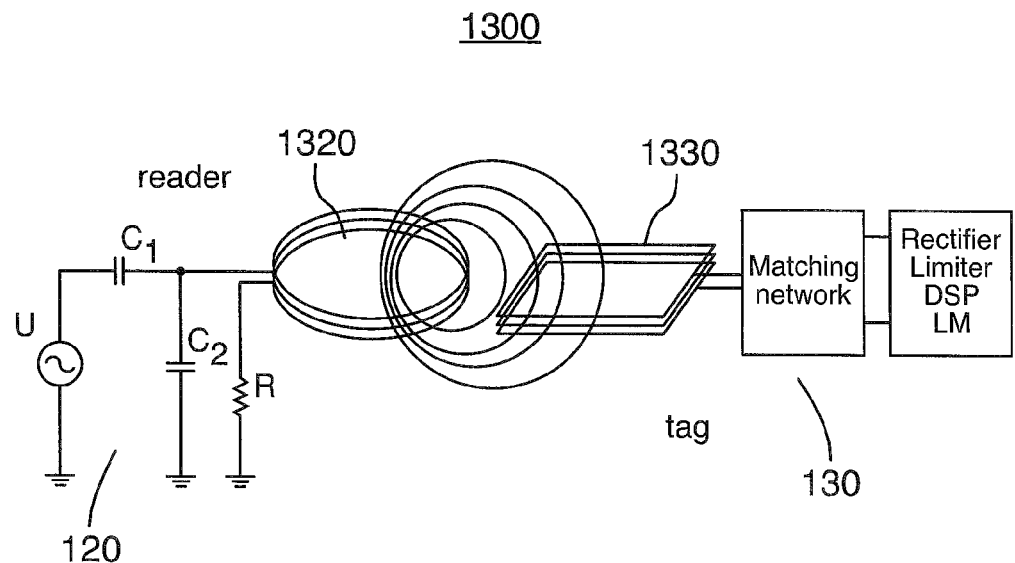
FIG. 12($a$) is a block diagram illustrating inductive coupling between a reader and a wireless device in a RFID system in accordance with an embodiment of the invention.
Figure 12B:
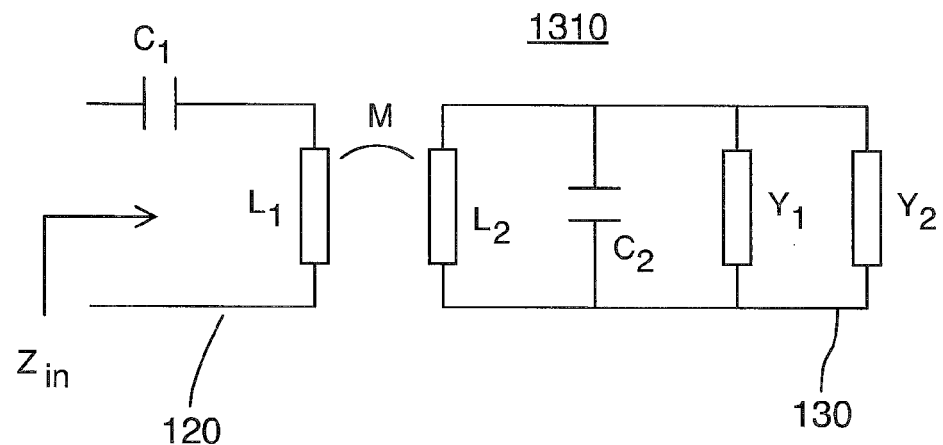
Figure 13:
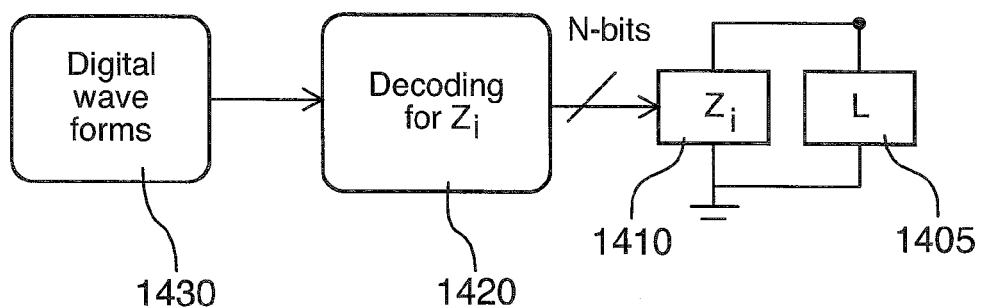

FIG. 12(*a*) is a block diagram illustrating inductive coupling between a reader 120 and a wireless device 130 in a RFID system 1300 in accordance with an embodiment of the invention. FIG. 12(*b*) is a block diagram illustrating an equivalent circuit 1310 for the RFID system 1300 of FIG. 12(*a*) in accordance with an embodiment of the invention. And, FIG. 13 is a block diagram illustrating a transmission apparatus 1400 using inductive coupling for a wireless device 130 for transmitting signals to a reader 120 based on a digital waveform input 1430 in accordance with an embodiment of the invention.

According to one embodiment, communication between the reader 120 and the wireless device 130 may occur by sensing inductive loading changes in the reader 120. Here, the reader 120 communicates with the wireless device 120 via magnetic or inductive coupling. This is shown in FIGS. 12(*a*) and 12(*b*). FIGS. 12(*a*) and 12(*b*) show the basic principle of an inductive coupled RFID system 1300. For inductive coupled systems 1300, the underlying coils are defined by their size. It is known that a coupling system of two coils 1320, 1330 may be represented by an equivalent transformer. The connection between these two coils 1320, 1330 is given by the magnetic field (B) and the underlying value to describe this connection is the mutual inductance (M) and/or the coupling factor (k).

The law of Biot and Savart is given by:

$$\vec{B} = \frac{\mu_o i_1}{4\pi} \oiint_S \frac{\vec{ds} \times \vec{x}}{|\vec{x}|^3}$$

This allows the calculation of the magnetic field at every point as a function of the current, $i_1$, as well as the geometry. Here, $\mu_o$ is the permeability, x is the distance, and S describes the integration-path along the coil. Furthermore, the mutual inductance and the coupling factor are given by:

$$M = \int_{A_2} \frac{B(i_1)}{i_1} dA_2$$

$$k = \frac{M}{\sqrt{L_1 L_2}}$$

In these equations, $A_2$ describes the area of the second coil and $L_1$ and $L_2$ are the inductances of the two coils 1320, 1330. The distance x between the reader-coil 1320 and transponder-coil 1330 also determines the coupling factor. The equivalent model for this coupling is shown in FIG. 12(*b*). The impedance value $Z_i$ as seen by the reader 120 is directly related to the admittances Y1 and Y2. The admittances Y1 and Y2 are either modulated via amplitude (e.g., ASK) or in phase (e.g., PSK). The admittances Y1 and Y2 may also be modulated using multi-phase PSK and multi-amplitude ASK.

General speaking, the signal received back by the reader 120 is a function of the impedance value changing in the wireless device 130. Once this impedance value changes, the signal seen by the reader 120 is modified and the reader 120 can detect this.

As in the case of backscattering, as shown in FIG. 13, a variable impedance 1410 may be modified by a decoder 1420. Here, L 1405 is the inductance on the wireless device side. As in the case of backscattering, the same methods described above may be used for: (i) generating I and Q signals; (ii) generating singe side band ("SSB") signals; (iii) generating phase only modulated signals; (iv) general mapping from decoding to what the reader sees; (v) if a signal is known by the reader, pre-distorting the signal to produce a corrected signal.

Summarizing the above, and referring again to FIG. 13, according to one embodiment there is provided a transmission apparatus 1400 for modifying an incoming radio frequency (RF) signal comprising: an inductive element 1405; an array of impedances 1410 controlled by switches and circuits having an output electrically coupled to the inductive element 1405; and, at least one digital block 1420 coupled to the array of impedances 1410 for digitally controlling the impedance value $Z_i$ of the array of impedances 1410; wherein the incoming RF signal is modified as the coupled array of impedances 1410 of the inductive element 1405 is adjusted.

The output of the decoder 1420 may switch the array of impedances 1410 between various states which modifies the incoming RF signal. The signal 1430 applied to the digital block 1420 may take the form of any complex modulation signal, for example, GMSK, nPSK, 8PSK, nQAM, OFDM, etc., and such signals may be offset from the incoming radio frequency signal by a frequency+/−ω.

The input 1430 to the digital block 1420 may alternate between the in-phase (i.e., I) and quadrature (i.e., Q) signals via a control signal. Also, the array of impedances 1410 may modify the incoming RF signal from 0 to 90 degrees offset depending on whether the data is I or Q data. For example, if the I signal would produce an impedance value at theta degrees then the Q signal would produce an impedance value that is theta+90 degrees. The control signal may be a clock signal (e.g., 1160). The signals (e.g., 1070) applied to the I and Q signals may take the form of a DC signal or of sine and cosine waves at a selected frequency. The I and Q signals applied to the digital block 1420 may be adjusted to compensate for any errors in the impedance array 1410 due to variations in the impedance value in the array. The array of impedances 1410 may have some filtering characteristics to filter off some of the DAC quantized out of band noise. And, the reader 120 used to detect the modulated signal may compensate for any errors generated within the impedance array 1410 or the digital block 1420.

Thus, according to one embodiment, there is provided a transmission apparatus 800 for a wireless device 130, comprising: an antenna 133 for receiving an original signal and for backscattering a modulated signal containing information 830 from the wireless device 120; a variable impedance 810 coupled to the antenna 133, the variable impedance 810 having an impedance value $Z_i$; and, a decoder 820 coupled to the variable impedance 810 for modulating the impedance value $Z_i$, and thereby a backscattering coefficient Γ for the antenna 133, in accordance with the information 830 to generate the modulated signal (e.g., an arbitrary modulated signal).

In the above transmission apparatus 800, the variable impedance 810 may be coupled in series with the antenna 133. The wireless device 130 may be powered by energy 140 from the original signal. The variable impedance 810 may include an array of impedances and respective switches. The decoder 820 may include a backscattering coefficient Γ to impedance value $Z_i$ decoder. The information 830 may be an N-bit digital waveform 830. The N-bit digital waveform 830 may be applied to the decoder 820 to produce a control signal 821 for the variable impedance 810 that is related to the N-bit digital waveform 830. A change in the impedance value $Z_i$ may backscatter the original signal to produce the modulated signal, the modulated signal being a frequency offset (e.g., up-converted) form of the N-bit digital waveform 830. The control signal 821 for the variable impedance 810 may switch an array of impedances within the variable impedance 810 which may change characteristics of the backscattering coefficient Γ of the antenna 133. The information 830 may be a complex modulation signal 1030. The complex modulation signal 1030 may be offset in frequency from the original signal. The complex modulation signal 1030 may be one of a GMSK signal, a nPSK signal, a 8PSK signal, a nQAM signal, and an OFDM signal. The complex modulation signal 1030 may be represented by I+jQ, where I is an inphase component, Q is a quadrature component, and j is a square root of −1. The complex modulation signal 1030 may alternate between an in-phase signal (I) and a quadrature signal (Q) via a control signal. The variable impedance 810, 1010 may switch between backscattering coefficients that are 90 degrees offset from each other depending on whether the complex modulation signal 1030 is the in-phase signal (I) or the quadrature signal (Q). The control signal may be a clock signal 1160. The transmission apparatus 800, 1100 may further include a digital signal generator 1040. The digital signal generator 1040 may apply a constant value signal to the in-phase signal (I) and the quadrature signal (Q). The digital signal generator 1040 may apply sine and cosine wave signals 1070 to the in-phase signal (I) and the quadrature signal (Q), respectively. The complex modulation signal 1030 may be a sum of an in-phase signal (I) and a quadrature signal (Q). The transmission apparatus 800, 1000 may further include a digital signal generator 1040. The digital signal generator 1040 may apply a constant value signal to the in-phase signal (I) and the quadrature signal (Q). The digital signal generator 1040 may apply sine and cosine wave signals 1070 to the in-phase signal (I) and the quadrature signal (Q), respectively. The N-bit digital waveform 830 may be adjusted to compensate for errors in at least one of the decoder 820 and the variable impedance 810. The variable impedance 810 may include a filter for filtering noise generated by the decoder 820. The modulated signal may be an arbitrary signal. The wireless device 120 may be a RFID tag. The original signal may be received from a RFID reader 120. The RFID reader 120 may be configured to correct for errors in at least one of the decoder 820 and the variable impedance 810. And, the transmission apparatus 800 may further include a processor for controlling the transmission apparatus 800 and memory for storing the information 830.

The above embodiments may contribute to an improved method and apparatus for communications between wireless device 130 and reader 120 in backscattered and inductively coupled radio frequency identification systems and may provide one or more advantages. For example, the wireless devices 130 of the present invention are not limited in the nature of signals that they may backscatter or inductively couple to the reader 120. In addition, the wireless devices 130 of the present invention allow for filtering of these signals.

The embodiments of the invention described above are intended to be exemplary only. Those skilled in this art will understand that various modifications of detail may be made to these embodiments, all of which come within the scope of the invention.

What is claimed is:

1. A transmission apparatus for a wireless device, comprising:

an antenna for receiving an original signal and for backscattering a modulated signal containing information from the wireless device;

a variable impedance coupled to the antenna, the variable impedance having an impedance value; and, a decoder coupled to the variable impedance for modulating the impedance value, and thereby a backscattering coefficient for the antenna, in accordance with the information to generate the modulated signal;

wherein the information is an N-bit digital waveform;

wherein the N-bit digital waveform is applied to the decoder to produce a control signal for the variable impedance that is related to the N-bit digital waveform; and, wherein a change in the impedance value backscatters the original signal to produce the modulated signal, the modulated signal being a frequency offset form of the N-bit digital waveform.

2. The transmission apparatus of claim 1 wherein the variable impedance is coupled in series with the antenna.

3. The transmission apparatus of claim 1 wherein the wireless device is powered by energy from the original signal.

4. The transmission apparatus of claim 1 wherein the variable impedance includes an array of impedances and respective switches.

5. The transmission apparatus of claim 1 wherein the decoder includes a backscattering coefficient to impedance value decoder.

6. The transmission apparatus of claim 1 wherein the control signal for the variable impedance switches an array of impedances within the variable impedance which changes the impedance value and thereby changes characteristics of the backscattering coefficient of the antenna.

7. The transmission apparatus of claim 1 wherein the N-bit digital waveform is adjusted to compensate for errors in at least one of the decoder and the variable impedance.

8. The transmission apparatus of claim 1 wherein the variable impedance includes a filter for filtering noise generated by the decoder.

9. The transmission apparatus of claim 1 wherein the modulated signal is an arbitrary signal.

10. The transmission apparatus of claim 1 wherein the wireless device is a radio frequency identification ("RFID") tag.

11. The transmission apparatus of claim 1 wherein the original signal is received from a RFID reader.

12. The transmission apparatus of claim 11 wherein the RFID reader is configured to correct for errors in at least one of the decoder and the variable impedance.

13. The transmission apparatus of claim 1 and further comprising a processor for controlling the transmission apparatus and memory for storing the information.

14. A transmission apparatus for a wireless device, comprising:

an inductor for receiving an original signal and for transmitting by mutual inductance a modulated signal containing information from the wireless device;

a variable impedance coupled to the inductor, the variable impedance having an impedance value; and, a decoder coupled to the variable impedance for modulating the impedance value, and thereby a value of the mutual inductance, in accordance with the information to generate the modulated signal;

wherein the information is an N-bit digital waveform;

wherein the N-bit digital waveform is a lied to the decoder to produce a control signal for the variable impedance that is related to the N-bit digital waveform; and, wherein the modulated signal is a frequency offset form of the N-bit digital waveform.

15. The transmission apparatus of claim 14 wherein the variable impedance is coupled in parallel with the inductor.

16. The transmission apparatus of claim 14 wherein the wireless device is powered by energy from the original signal.

17. The transmission apparatus of claim 14 wherein the variable impedance includes an array of impedances and respective switches.

18. The transmission apparatus of claim 14 wherein the control signal for the variable impedance switches an array of impedances within the variable impedance which changes the impedance value.

19. The transmission apparatus of claim 14 wherein the N-bit digital waveform is adjusted to compensate for errors in at least one of the decoder and the variable impedance.

20. The transmission apparatus of claim 14 wherein the variable impedance includes a filter for filtering noise generated by the decoder.

21. The transmission apparatus of claim 14 wherein the modulated signal is an arbitrary signal.

22. The transmission apparatus of claim 14 wherein the wireless device is a radio frequency identification ("RFID") tag.

23. The transmission apparatus of claim 14 wherein the original signal is received from a RFID reader.

24. The transmission apparatus of claim 23 wherein the RFID reader is configured to correct for errors in at least one of the decoder and the variable impedance.

25. The transmission apparatus of claim 14 and further comprising a processor for controlling the transmission apparatus and memory for storing the information.

26. A transmission apparatus for a wireless device, comprising:

an antenna for receiving an original signal and for backscattering a modulated signal containing information from the wireless device;

a variable impedance coupled to the antenna, the variable impedance having an impedance value; and, a decoder coupled to the variable impedance for modulating the impedance value, and thereby a backscattering coefficient for the antenna, in accordance with the information to generate the modulated signal;

wherein the information is a complex modulation signal; and, wherein the complex modulation signal alternates between an in-phase signal and a quadrature signal via a control signal.

27. The transmission apparatus of claim 26 wherein the complex modulation signal is offset in frequency from the original signal.

28. The transmission apparatus of claim 26 wherein the complex modulation signal is one of a GMSK signal, a nPSK signal, a 8PSK signal, a nQAM signal, and an OFDM signal.

29. The transmission apparatus of claim 26 wherein the complex modulation signal is represented by I+jQ, where I is an in-phase component, Q is a quadrature component, and j is a square root of −1.

30. The transmission apparatus of claim 26 wherein the variable impedance switches between backscattering coefficients that are 90 degrees offset from each other depending on whether the complex modulation signal is the in-phase signal or the quadrature signal.

31. The transmission apparatus of claim 26 wherein the control signal is a clock signal.

32. The transmission apparatus of claim 26 and further comprising a digital signal generator.

33. The transmission apparatus of claim 32 wherein the digital signal generator applies a constant value signal to the in-phase signal and the quadrature signal.

34. The transmission apparatus of claim 32 wherein the digital signal generator applies sine and cosine wave signals to the in-phase signal and the quadrature signal, respectively.

35. The transmission apparatus of claim 26 wherein the complex modulation signal is a sum of an in-phase signal and a quadrature signal.

36. The transmission apparatus of claim 35 and further comprising a digital signal generator.

37. The transmission apparatus of claim 36 wherein the digital signal generator applies a constant value signal to the in-phase signal and the quadrature signal.

38. The transmission apparatus of claim 36 wherein the digital signal generator applies sine and cosine wave signals to the in-phase signal and the quadrature signal, respectively.

39. A transmission apparatus for a wireless device, comprising:
an inductor for receiving an original signal and for transmitting by mutual inductance a modulated signal containing information from the wireless device;
a variable impedance coupled to the inductor, the variable impedance having an impedance value; and,
a decoder coupled to the variable impedance for modulating the impedance value, and thereby a value of the mutual inductance, in accordance with the information to generate the modulated signal;
wherein the information is a complex modulation signal; and,
wherein the complex modulation signal alternates between an in-phase signal and a quadrature signal via a control signal.

40. The transmission apparatus of claim 39 wherein the complex modulation signal is offset in frequency from the original signal.

41. The transmission apparatus of claim 39 wherein the complex modulation signal is one of a GMSK signal, a nPSK signal, a 8PSK signal, a nQAM signal, and an OFDM signal.

42. The transmission apparatus of claim 39 wherein the complex modulation signal is represented by I+jQ, where I is an in-phase component, Q is a quadrature component, and j is a square root of −1.

43. The transmission apparatus of claim 39 wherein the variable impedance switches between impedance values that are 90 degrees offset from each other depending on whether the complex modulation signal is the in-phase signal or the quadrature signal.

44. The transmission apparatus of claim 39 wherein the control signal is a clock signal.

45. The transmission apparatus of claim 39 and further comprising a digital signal generator.

46. The transmission apparatus of claim 45 wherein the digital signal generator applies a constant value signal to the in-phase signal and the quadrature signal.

47. The transmission apparatus of claim 45 wherein the digital signal generator applies sine and cosine wave signals to the in-phase signal and the quadrature signal, respectively.

48. The transmission apparatus of claim 39 wherein the complex modulation signal is a sum of an in-phase signal and a quadrature signal.

49. The transmission apparatus of claim 48 and further comprising a digital signal generator.

50. The transmission apparatus of claim 49 wherein the digital signal generator applies a constant value signal to the in-phase signal and the quadrature signal.

51. The transmission apparatus of claim 49 wherein the digital signal generator applies sine and cosine wave signals to the in-phase signal and the quadrature signal, respectively.

* * * * *